US012768979B2

(12) United States Patent
Henry et al.

(10) Patent No.: US 12,768,979 B2
(45) Date of Patent: Oct. 20, 2026

(54) MULTIPATH CORRECTION METHOD FOR FINE TIMING MEASUREMENTS

(71) Applicant: Cisco Technology, Inc., San Jose, CA (US)

(72) Inventors: Jerome Henry, Pittsboro, NC (US); Laurent Alexandre Pierrugues, San Jose, CA (US); Behrouz Shayesteh, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 346 days.

(21) Appl. No.: 18/409,708

(22) Filed: Jan. 10, 2024

(65) Prior Publication Data

US 2025/0224507 A1 Jul. 10, 2025

(51) Int. Cl.
*G01S 13/76* (2006.01)
*G01S 13/87* (2006.01)

(52) U.S. Cl.
CPC .......... *G01S 13/765* (2013.01); *G01S 13/878* (2013.01)

(58) Field of Classification Search
CPC ...... G01S 13/47; G01S 13/767; G01S 13/765; G01S 13/878; G01S 2013/462; G01S 2013/464; G01S 5/0218; G01S 5/0273
See application file for complete search history.

(56) References Cited

U.S. PATENT DOCUMENTS

| | | | | |
|---|---|---|---|---|
| 9,143,967 | B2 * | 9/2015 | Chen | G01S 7/40 |
| 11,131,743 | B2 * | 9/2021 | Aldana | G01S 5/0009 |
| 12,339,351 | B2 * | 6/2025 | Liu | G01S 13/781 |
| 2015/0289099 | A1 * | 10/2015 | Marano | H04W 4/023 455/456.1 |
| 2016/0033613 | A1 * | 2/2016 | Hahn | G01S 5/0273 375/267 |
| 2016/0033617 | A1 * | 2/2016 | Hahn | G01S 5/0218 370/252 |
| 2018/0249437 | A1 * | 8/2018 | Lindskog | G01S 13/878 |

(Continued)

OTHER PUBLICATIONS

International Search Report and Written Opinion for International Application No. PCT/US2025/010992, mailed May 7, 2025, 15 Pages.

*Primary Examiner* — Peter M Bythrow
(74) *Attorney, Agent, or Firm* — Rutan & Tucker, LLP; Ravi Mohan; Marc A. McClain

(57) ABSTRACT

Described herein are devices, systems, methods, and processes for improving the accuracy of fine timing measurement (FTM)-based ranging in wireless networks. An initiating device may select optimal transmit and receive chains for ranging measurements between the initiating device and a responding device. The selection can be based on the quality of the link between the devices, determined through the analysis of channel state information. The initiating device can further detect non-line-of-sight conditions and can apply correction factors to minimize the error caused by multipath reflections. The outcome is a more accurate estimate of the distance between devices, enhancing the precision of location determination in wireless networks, particularly in challenging indoor environments. Moreover, the initiating device may dynamically select the best transmit and receive chains as the initiating device ranges with different responding devices in various directions and orientations.

19 Claims, 11 Drawing Sheets

(56) References Cited

U.S. PATENT DOCUMENTS

| | | | | |
|---|---|---|---|---|
| 2019/0182793 | A1* | 6/2019 | Wang | H04B 7/063 |
| 2019/0293780 | A1* | 9/2019 | Li | G01S 13/765 |
| 2019/0349280 | A1* | 11/2019 | Zhang | H04L 43/0864 |
| 2019/0380054 | A1* | 12/2019 | Manolakos | H04L 5/0057 |
| 2020/0132823 | A1* | 4/2020 | Yun | G01S 13/726 |
| 2020/0267681 | A1* | 8/2020 | Ferrari | H04B 17/27 |
| 2021/0075526 | A1* | 3/2021 | Pefkianakis | H04B 7/0691 |
| 2021/0282108 | A1* | 9/2021 | Smith | H04W 64/003 |
| 2021/0341565 | A1* | 11/2021 | Fellhauer | G01S 13/765 |
| 2021/0392568 | A1* | 12/2021 | Henry | H04W 24/08 |
| 2022/0158702 | A1* | 5/2022 | Nallampatti Ekambaram | H04B 7/0617 |
| 2022/0299629 | A1* | 9/2022 | Liu | G01S 7/006 |
| 2022/0357419 | A1* | 11/2022 | Givehchian | G01S 13/878 |
| 2023/0007976 | A1 | 1/2023 | Sheriff et al. | |
| 2023/0067671 | A1* | 3/2023 | Kumari | G01S 13/003 |
| 2023/0071554 | A1* | 3/2023 | Zhang | G07C 9/00309 |
| 2023/0100617 | A1* | 3/2023 | Kumari | G01S 7/006<br>342/58 |
| 2023/0217408 | A1* | 7/2023 | Lu | H04W 28/06<br>455/456.1 |
| 2023/0417855 | A1* | 12/2023 | Peng | G01S 19/22 |
| 2024/0411009 | A1* | 12/2024 | Zhang | G01S 5/0278 |
| 2025/0168808 | A1* | 5/2025 | Ramachandran | H04W 24/10 |

* cited by examiner

MULTIPATH CORRECTION METHOD FOR FINE TIMING MEASUREMENTS

The present disclosure relates to wireless networking. More particularly, the present disclosure relates to fine timing measurement (FTM) based ranging in wireless networks.

BACKGROUND

Wireless networks have become an integral part of modern communication systems, providing connectivity for a wide range of devices. One of the aspects of these networks is the ability to accurately determine the location of devices within the network. This is particularly important in indoor environments where global navigation satellite (GNSS)-based location services may not be effective. Fine timing measurement (FTM) is a technique that has been increasingly used for indoor location determination, especially in scenarios involving access point to access point (AP-to-AP) and client device (e.g., a station, a STA) to access point cases.

However, FTM-based location determination faces challenges in non-line-of-sight (nLOS) scenarios. In such situations, strong reflections, often referred to as "canyons," can cause inaccurate ranging results. This is because the signal may reach the receiver after a path longer than a straight line due to reflections, or reflected artifacts may cause a lobe to reach the receiver at the wrong time, resulting in a computed distance that is shorter than the actual straight-line distance. The problem is further exacerbated in AP-to-AP ranging scenarios. This is because the design of the APs, their placement, and the physical obstacles in the environment can significantly degrade the signal quality, especially when measurements are lateral, e.g., through the AP body. As a result, there can be scenarios where AP-to-AP ranging works optimally, but many other scenarios where AP-to-AP ranging provides inaccurate results.

Existing solutions attempt to mitigate these issues by leveraging the law of large numbers, where the device in need of location determination ranges against multiple responding devices, then uses some noisy distance solution method to dilute the error of one pair against the others. However, this approach is not always reliable, especially when many responding devices are in nLOS or when the number of available responding devices is small. Therefore, there is a need for a more effective approach to handle the challenges in FTM-based location determination in wireless networks.

SUMMARY OF THE DISCLOSURE

Systems and methods for fine timing measurement (FTM) based ranging in wireless networks in accordance with embodiments of the disclosure are described herein. In some embodiments a network device includes a processor, at least one network interface controller configured to provide access to a network, and a memory communicatively coupled to the processor, wherein the memory includes a ranging logic. The logic is configured to select a transmit chain in a plurality of transmit chains of the network device and a receive chain in a plurality of receive chains of the network device for a ranging measurement associated with a first network device, transmit a ranging request frame to the first network device based on the selected transmit chain, receive a ranging response frame from the first network device based on the selected receive chain, and determine a distance between the network device and the first network device based on a round-trip time between the network device and the first network device.

In some embodiments, the round-trip time corresponds to a duration between the transmission of the ranging request frame and the reception of the ranging response frame.

In some embodiments, the ranging request frame includes a fine timing measurement (FTM) request frame, and the ranging response frame includes an FTM response frame.

In some embodiments, to select the transmit chain, the ranging logic is further configured to transmit, using each of the plurality of transmit chains, a respective test frame to the first network device, receive channel state information (CSI) feedback associated with each test frame, and determine, for each of the plurality of transmit chains, an outgoing link quality associated with the first network device based on the received respective CSI feedback, wherein the transmit chain is selected based on the transmit chain being associated with a highest outgoing link quality in the plurality of transmit chains.

In some embodiments, the test frame includes a beamforming sound frame or an initiator fine timing measurement (iFTM) frame.

In some embodiments, to select the receive chain, the ranging logic is further configured to receive, using the plurality of receive chains, one or more test frames from the first network device, determine per-receive chain channel state information (CSI) for each of the plurality of receive chains based on the received one or more test frames, and determine, for each of the plurality of receive chains, an incoming link quality associated with the first network device based on the per-receive chain CSI, wherein the receive chain is selected based on the receive chain being associated with a highest incoming link quality in the plurality of receive chains.

In some embodiments, the ranging logic is further configured to transmit an indication of the selected transmit chain or an indication of the selected receive chain to the first network device or a controller.

In some embodiments, the ranging logic is further configured to store an indication of the selected transmit chain and an indication of the selected receive chain in a data store.

In some embodiments, the ranging logic is further configured to re-select the transmit chain and the receive chain for another ranging measurement associated with the first network device based on the stored indication of the selected transmit chain and the stored indication of the selected receive chain.

In some embodiments, the ranging logic is further configured to determine whether a channel between the network device and the first network device experiences a line-of-sight (LOS) condition or a non-LOS (nLOS) condition.

In some embodiments, to determine whether the channel experiences the LOS condition or the nLOS condition, the ranging logic is further configured to obtain a plurality of tentative ranging measurements associated with the first network device over a plurality of bands based on the selected transmit chain and the selected receive chain, and determine a spread of the plurality of tentative ranging measurements, wherein the channel is determined to experience the LOS condition if the spread of the plurality of tentative ranging measurements is less than a threshold, and the channel is determined to experience the nLOS condition if the spread of the plurality of tentative ranging measurements is greater than the threshold.

In some embodiments, each tentative ranging measurement in the plurality of tentative ranging measurements is based on a respective measurement bandwidth, and device in response to the channel being determined to experience the LOS condition, the ranging logic is further configured to take a tentative ranging measurement based on a greatest measurement bandwidth as the determined distance between the network device and the first network device.

In some embodiments, in response to the channel being determined to experience the nLOS condition, the ranging logic is further configured to select a band associated with least signal distortion in the plurality of bands, and take a tentative ranging measurement obtained over the selected band associated with the least signal distortion as the determined distance between the network device and the first network device.

In some embodiments, to determine the band associated with the least signal distortion, the ranging logic is further configured to transmit, for each band in the plurality of bands, one or more test frames to the first network device based on the selected transmit chain, receive, for each band in the plurality of bands, channel state information (CSI) feedback associated with the respective one or more test frames, and determine, for each band in the plurality of bands, a respective CSI distortion factor based on the corresponding CSI feedback, wherein the band associated with the least signal distortion corresponds the band having a lowest CSI distortion factor.

In some embodiments, the respective CSI distortion factor is determined based on a structure of the corresponding CSI feedback.

In some embodiments, the structure of the corresponding CSI feedback includes one or more depths of one or more dips and a count of the one or more dips.

In some embodiments, the ranging logic is further configured to calculate a correction factor based on the lowest CSI distortion factor, and apply the correction factor to the determined distance between the network device and the first network device.

In some embodiments, the network device includes an access point (AP).

In some embodiments a network device includes a processor, at least one network interface controller configured to provide access to a network, and a memory communicatively coupled to the processor, wherein the memory includes a ranging logic. The logic is configured to select a transmit chain in a plurality of transmit chains of the network device and a receive chain in a plurality of receive chains of the network device for a ranging measurement associated with a first network device, determine whether a channel between the network device and the first network device experiences a line-of-sight (LOS) condition or a non-LOS (nLOS) condition, transmit a ranging request frame to the first network device based on the selected transmit chain, receive a ranging response frame from the first network device based on the selected receive chain, and determine a distance between the network device and the first network device based on a round-trip time between the network device and the first network device and the channel being determined to experience the LOS condition or the nLOS condition.

In some embodiments, a method for performing a ranging measurement includes selecting a transmit chain in a plurality of transmit chains of a network device and a receive chain in a plurality of receive chains of the network device for the ranging measurement associated with a first network device. The method may also be configured for transmitting a ranging request frame to the first network device based on the selected transmit chain, receiving a ranging response frame from the first network device based on the selected receive chain, and determining a distance between the network device and the first network device based on a round-trip time between the network device and the first network device.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
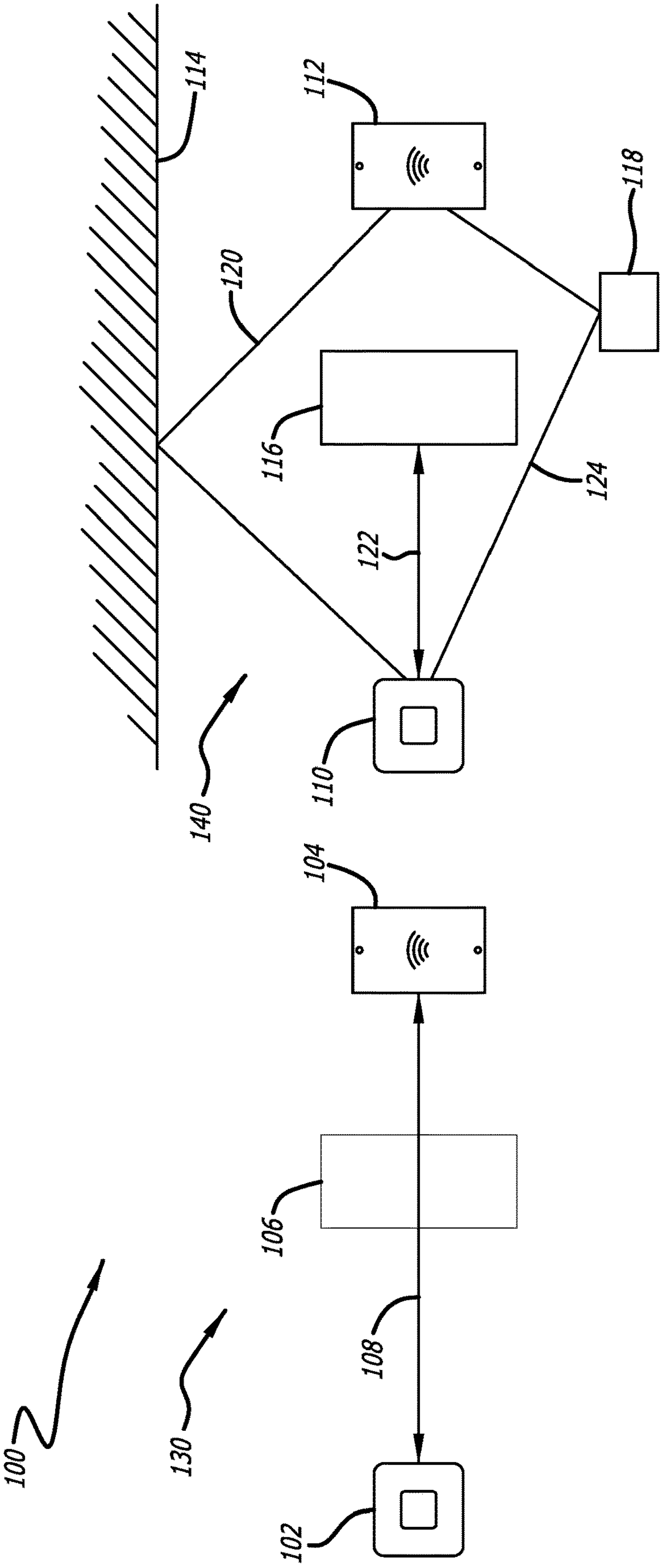
FIG. 1 is a diagram illustrating various scenarios of fine timing measurement (FTM)-based ranging in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that enhance the accuracy of fine timing measurement (FTM)-based ranging in wireless networks. FTM-based ranging may be a technique used in wireless networks where an initiating device (e.g., an initiating station (ISTA) for ranging) sends an FTM request frame to a responding device (e.g., a responding station (RSTA) for ranging), and the distance between the two devices can be calculated based on the round-trip time of the FTM response frame received back at the initiating device. In many embodiments, each of the initiating device and the responding device can select transmit and receive chains for ranging measurements between the two devices. The selection may be based on the quality of the link between the devices, determined through the analysis of channel state information (CSI) feedback.

In a number of embodiments, the network devices (e.g., APs) may have multiple radios on different channels. Multiple radios (receive/transmit chains) can operate on a given channel. By way of non-limiting examples, a network device may have 2, 3, 4, 5 . . . transmit chains and 2, 3, 4, 5, . . . receive chains. In a variety of embodiments, a pair of ranging network devices can each set one of their radios to a common channel. The network devices may not know their relative orientation or distance, and thus cannot know if chain 0 exchanges will be biased. In some embodiments, the responding device can send a beamforming sound frame from its different radio chains. The initiating device may receive the frames on all its receive chains. In more embodiments, initiator FTM (iFTM) frames may be utilized instead for the beamforming sound frames. The beamforming sound frame, iFTM frames, or other suitable frames may be referred to hereinafter as test frames. In additional embodiments, the operation can be repeated in the reverse direction. In further embodiments, the transmitting side may retain the order of the transmission, which may be the transmit chain number ordering for the transmissions.

In still more embodiments, each receiving side can measure the CSI of the received signal on each of the receive chains. Thus, the signal sent from a single transmit chain may be observed on multiple receive chains simultaneously. In still further embodiments, the inverse fast Fourier transform (IFFT) on each receive chain can provide the channel impulse response (CIR) measure, which may be utilized to evaluate the link between the transmitter (e.g., the transmit chain) and the receiver (e.g., the receive chain). Thus, besides gain and scaling, the initial test frame exchange can allow each receiving side to estimate, for each subcarrier, the quality of the link (for each subcarrier). In still additional embodiments, the receiving side of a test frame can provide CSI feedback to the transmitting side.

In some more embodiments, based on the CSI (or CSI feedback), each device may determine a best transmit chain and a best receive chain (that is, the transmit chain and the receive chain associated with the highest CSI quality) at the device for FTM-based ranging-related exchanges with the other device. In certain embodiments, the CSI with the ideal quality may appear as a flat signal. In other words, high quality CSI across the channel can have a low CSI peak/trough count and low variation across the channel. A low CSI peak/trough count and low variations may be indicative of reduced obstacle presence on the path. In yet more embodiments, it may be likely that both sides can come to the same conclusion regarding the best transmit and receive chains. However, in still yet more embodiments, the decision can be local. In other words, each device may make its own independent decision based on its observations and measurements.

In many further embodiments, at least one side of the initial test frame exchange may share the result of the transmit and receive chain selection with the other side. In many additional embodiments, the indication of the selected transmit and receive chains can be shared via FTM frames. In still yet further embodiments, the other side may receive a sorted list of transmissions (e.g., from best to worst, transmissions 2, 4, 1, 3), allowing the transmit side to know which chain or chain combination to utilize when ranging with that other device. In still yet additional embodiments, the result of the radio chain selection can be shared with controller or a central system, such as, but not limited to, a wireless local area network (LAN) controller (WLC).

In several embodiments, a device may store the result of the radio chain selection in a data store (e.g., a test table). In several more embodiments, when a device finds that an initial test frame exchange process has been performed with another device with which a ranging measurement is to be (re-)attempted, the device can retrieve the corresponding radio chain selection result from the data store, and may utilize the transmit and receive chains as indicated by the retrieved result to range against the other device. Therefore, the initial test frame exchange process may not need to be repeated. In numerous embodiments, a device can utilize different transmit and receive chain combinations when ranging against other devices in different directions or quadrants. Accordingly, the optimal transmit and receive chains can be chosen and utilized each time a ranging measurement is performed, resulting in more accurate range measurements for each pair of devices.

In numerous additional embodiments, the initiating device may range against the responding device on different enabled radios, which can correspond to different bands, and over multiple or all possible bandwidths (e.g., 20, 40, 80, etc. MHz). The initiating device can then compare the range measurements obtained from ranging in the different bands. In a line-of-sight (LOS) scenario, the range measurements may approximately be the same, with higher accuracy and smaller variance for range measurements obtained on larger bandwidths. If these conditions are observed (e.g., if range measurements obtained over different bands converge, if the spread of the range measurements obtained over different bands is less than a threshold, etc.), the initiating device may conclude on an LOS scenario (i.e., the initiating device may determine that the channel is experiencing an LOS condition), and can adopt the range measurement obtained on the larger bandwidths as the result. In further additional embodiments, the initiating device may proceed to range against another responding device. In some embodiments, an LOS condition may include an FTM-LOS condition. In an FTM-LOS condition, obstacles may be present, but may not create reflections or canyon effects that can stretch or compress the obtained range measurement. By way of non-limiting examples, simple, non-reflecting obstacles, such as, but not limited to, a wall between the initiating device and the responding device located in different rooms, may have an effect on the received signal strength indicator (RSSI), but no significant effect on the FTM-based range measurements.

When a non-LOS (nLOS) condition is present, the reflection pattern on obstacles in the environment may cause the initiating device to receive a reflected component as the primary signal, while the LOS signal can be too weak to reach the initiating device. The reflection pattern can be affected by the obstacles in the environment, and the frequency and bandwidth of the signal. In more embodiments, a direct consequence of this phenomenon may be that the range measurements obtained through reflected paths are not the same (i.e., the range measurements do not converge, the spread of the range measurements is greater than a threshold, etc.) when performed on different bands. However, the initiating device cannot know which band is associated with more accurate range measurements, if the range measurements are obtained over a same bandwidth (e.g., 80 MHz). Thus, in additional embodiments, when the range measurements obtained on different bands are different, the initiating device may conclude on an nLOS scenario (i.e., the initiating device may determine that the channel is experiencing an nLOS condition).

In further embodiments, when the range measurements obtained on different bands are different, the initiating device may conclude on an nLOS scenario, and can (re-) evaluate the CSI of the FTM frames (or other frames) received in each band. Paths with a higher reflection pattern, which can correspond to the multipath effect, can suffer from more severe distortions to the signal, which may translate into a greater number of dips and/or deeper dips in the CSI structure.

In still more embodiments, the initiating device may compute a CSI distortion factor (or simply "distortion factor" hereinafter) for each band based on the corresponding CSI structure. In still further embodiments, the distortion factor can be a simple linear measurement of the depth of the dips, factored with the dip count over the band. In still additional embodiments, other metrics may also be utilized to evaluate the CSI distortion magnitude (corresponding to the distortion factor). In some more embodiments, by comparing the computed distortion factors, the initiating device can determine the degree to which each of the bands is affected by multipath.

In general, the multipath effect may affect the CIR peak detection accuracy; therefore, worse multipath can result in a less accurate range measurement. In certain embodiments, after computing the distortion factors, the initiating device can select the band with the lowest distortion factor as the band most likely to yield an accurate range measurement (i.e., closer to the ground truth). In yet more embodiments, the initiating device may apply a correction factor to the obtained range measurement, factoring in the distortion factor. In still yet more embodiments, the correction factor can be a heuristic computed from the comparison between the CSI distortion values obtained in different environments (e.g., a table correction). In many further embodiments, the correction factor may be algorithmic, and can represent a relationship between the increase in the range reported from the FTM-based measurement and the worsening of the CSI. In many additional embodiments, a (locally) linear function or a polynomial approximation can be utilized. As such, the error caused by multipath may be minimized, even though the exact ground truth cannot be found. Accordingly, embodiments can provide a comprehensive solution for improving the accuracy of FTM-based ranging in wireless networks.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram 100 illustrating various scenarios of FTM-based ranging in accordance with various embodiments of the disclosure is shown. In many embodiments, embodiment depicted in FIG. 1 may include a diagram 130 that shows an FTM-LOS scenario. In particular, as shown, an obstacle 106 can be situated between a responding device 102 and an initiating device 104. Despite the presence of the obstacle 106, a direct signal path 108 (e.g., an LOS path or a path very close to an LOS path) can still be established between the responding device 102 and the initiating device 104. The scenario shown in embodiments depicted in the diagram 130 can be identified as FTM-LOS, where obstacles may exist but do not create reflections or canyon effects that can distort the obtained range measurement. The obstacle 106, such as, but not limited to, a wall, may influence the RSSI, but it may not significantly impact the FTM-based range measurement.

In a number of embodiments, embodiment depicted in FIG. 1 may include a diagram 140 that illustrates an nLOS scenario. In particular, as shown, a reflective surface 114, such as, but not limited to, a wall or a ceiling, an obstacle 116, and a reflective obstacle 118 may be present in the environment surrounding a responding device 110 and an initiating device 112. The obstacle 116 can obstruct the straight line signal path 122 between the responding device 110 and the initiating device 112. The presence of the reflective surface 114 may create a reflected, non-straight line signal path 120 between the responding device 110 and the initiating device 112. Additionally, the reflective obstacle 118 can create another reflected signal path 124 between the responding device 110 and the initiating device 112. In nLOS conditions, such as the one shown in the embodiments depicted in the diagram 140, reflections (canyons), especially stronger ones, may cause wrong ranging results. In some cases, strict canyons can cause the signal to be reflected and the main lobe to reach the receiver after a path longer than a straight line. In other cases, reflected artifacts may cause a lobe to reach the receiver at the wrong time, causing the computed distance to be shorter than a straight line distance. In other words, the reflection pattern on obstacles in the environment may cause the initiating device to receive a reflected component as the primary signal. The reflection pattern can be influenced by the obstacles in the environment, and the frequency and bandwidth of the signal. Consequently, the range measurement obtained through reflected paths may not be the same when performed on different bands.

Although a specific embodiment for scenarios of FTM-based ranging suitable for carrying out the various steps, processes, methods, and operations described herein is discussed with respect to FIG. 1, any of a variety of systems and/or processes may be utilized in accordance with embodiments of the disclosure. For example, the initiating and responding devices may be equipped with multiple radios operating on different channels and bandwidths. The elements depicted in FIG. 1 may also be interchangeable with other elements of FIGS. 2-11 as required to realize a particularly desired embodiment.

Figure 2:
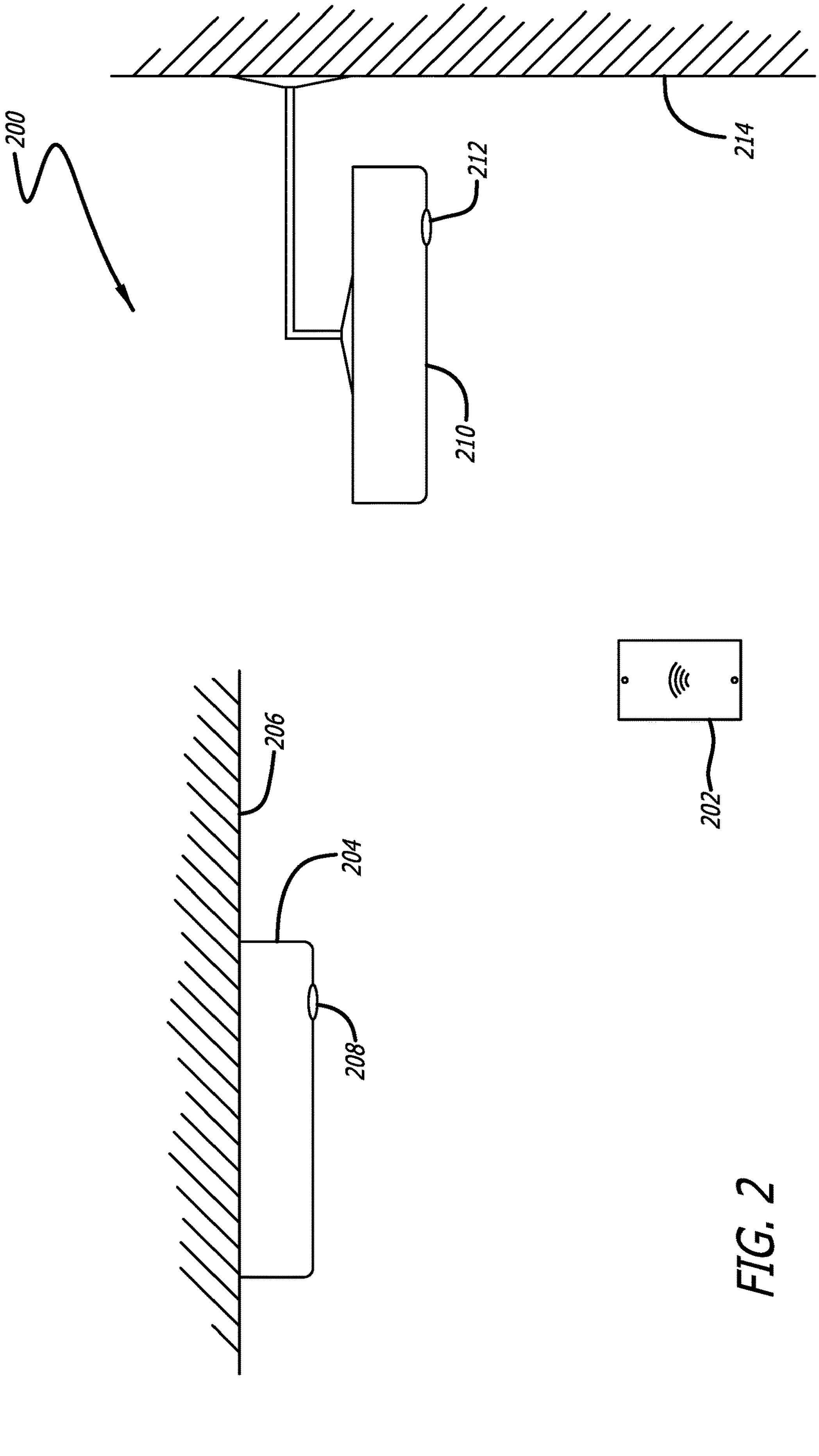
FIG. 2 is a diagram illustrating client device-to-access point (AP) ranging in accordance with various embodiments of the disclosure.

Referring to FIG. 2, a diagram 200 illustrating client device-to-AP ranging in accordance with various embodiments of the disclosure is shown. The embodiments depicted in FIG. 2 may show a scenario where a client device 202, operating as an initiating device, can perform FTM-based ranging to a first AP 204 and a second AP 210. Client device-to-AP ranging may be the scenario for which FTM-based ranging was originally designed. The client device can be expected to be at floor level (e.g., approximately 3 feet above the floor), while the APs may be at a distance, commonly at ceiling level or on a wall. In such a scenario, the object behind the AP, such as the wall or ceiling, may have little influence on the ranging performance. In addition, by convention, the APs can use a particular radio chain, specifically radio chain 0, to transmit and receive signals for the purpose of FTM-based ranging. This chain may typically be positioned in a way that it can have good LOS to where the client devices are supposed to be, which may usually be the floor level.

As shown, in many embodiments, the first AP 204 may be installed on a ceiling 206, and the second AP 210 can be installed adjacent to a wall 214. The location 208 on the bottom side of the first AP 204 may be where the antenna(s) of the transmit/receive chain 0 is/are located. Similarly, the location 212 on the bottom side of the second AP 210 can be where the antenna(s) of the transmit/receive chain 0 is/are located. In a number of embodiments, the client device 202, being positioned below the first AP 204 and the second AP 210, may have an LOS to both locations 208 and 212. The positioning of the devices as shown in the embodiments depicted in FIG. 2 may be consistent with the typical scenarios described above. Accordingly, the objects behind the APs 204 and 210, including the ceiling 206 and the wall 214, can have little influence on the ranging performance.

Although a specific embodiment for client device-to-AP ranging suitable for carrying out the various steps, processes, methods, and operations described herein is discussed with respect to FIG. 2, any of a variety of systems and/or processes may be utilized in accordance with embodiments of the disclosure. For example, the client device and the APs may incorporate advanced signal processing techniques to further enhance the accuracy of the FTM-based ranging. The elements depicted in FIG. 2 may also be interchangeable with other elements of FIGS. 1 and 3-11 as required to realize a particularly desired embodiment.

Figure 3:
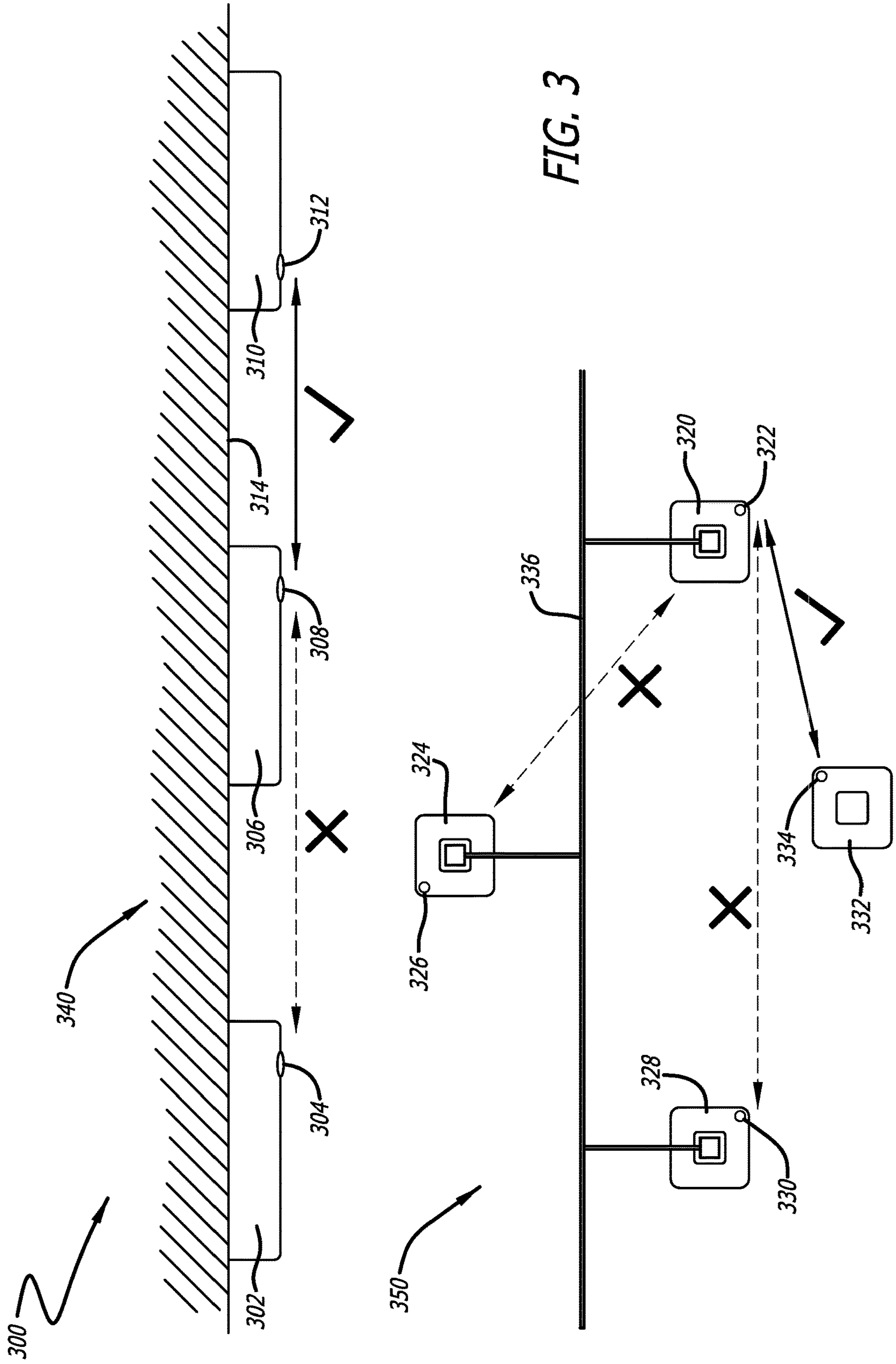
FIG. 3 is a diagram illustrating scenarios for AP-to-AP ranging in accordance with various embodiments of the disclosure.

Referring to FIG. 3, a diagram 300 illustrating scenarios for AP-to-AP ranging in accordance with various embodiments of the disclosure is shown. In AP-to-AP ranging scenarios, the layout of the APs can significantly affect the ranging results. There may be scenarios where conventional AP-to-AP ranging can generate satisfactory results, where the APs' layout may make the antennas of both APs' chain 0 face each other to provide LOS-like results. However, there can be many other scenarios where conventional AP-to-AP ranging may lead to an inaccurate result, typically when the antennas of both APs' chain 0 do not face each other, and the signal has to travel through the AP body. In many embodiments, embodiments depicted in the diagram 340 may show a scenario where APs 302, 306, and 310 can be installed on a ceiling 314. The antenna(s) for the transmit/receive chain 0 may be located at locations 304, 308, and 312, respectively for APs 302, 306, and 310. In a number of embodiments, there may be an LOS between the chain 0 of the AP 306 and the chain 0 of the AP 310. Accordingly, satisfactory results can be obtained from conventional FTM-based ranging between the AP 306 and the AP 310. However, there can be an nLOS condition between the chain 0 of the AP 302 and the chain 0 of AP 306, as the path may go through the body of the AP 306. The nLOS condition can lead to inaccurate ranging results due to signal degradation.

In a variety of embodiments, embodiments depicted in the diagram 350 may show a scenario where an AP 324 is installed adjacent to and at one side of a wall 336, and APs 328 and 320 are adjacent to and at the other side of the wall 336. Another AP 332 may be on the same side of the wall 336 as APs 328 and 320, but can be further away from the wall 336. The antenna(s) for chain 0 for APs 324, 328, 320, and 332 may be located at locations 326, 330, 322, and 334, respectively. In some embodiments, there may be an nLOS condition between the chain 0 of the AP 324 and the chain 0 of the AP 320 as the path can go through the bodies of APs 324 and 320 as well as the wall 336, which can result in inaccurate ranging results. Similarly, there may be an nLOS condition between the chain 0 of the AP 328 and the chain 0 of the AP 320 as the path can go through the body of the AP 320, potentially leading to inaccurate ranging results. However, there may be an LOS condition between the chain 0 of AP 332 and the chain 0 of the AP 320. Accordingly, satisfactory results can be obtained from conventional FTM-based ranging between the AP 332 and the AP 320.

Although a specific embodiment for scenarios for AP-to-AP ranging suitable for carrying out the various steps, processes, methods, and operations described herein is discussed with respect to FIG. 3, any of a variety of systems and/or processes may be utilized in accordance with embodiments of the disclosure. For example, the APs may be equipped with advanced antenna technology, such as, but not limited to, steerable antennas, that can dynamically adjust their radiation pattern to improve the quality of the signal path between the APs. The elements depicted in FIG. 3 may also be interchangeable with other elements of FIGS. 1, 2, and 4-11 as required to realize a particularly desired embodiment.

Figure 4:
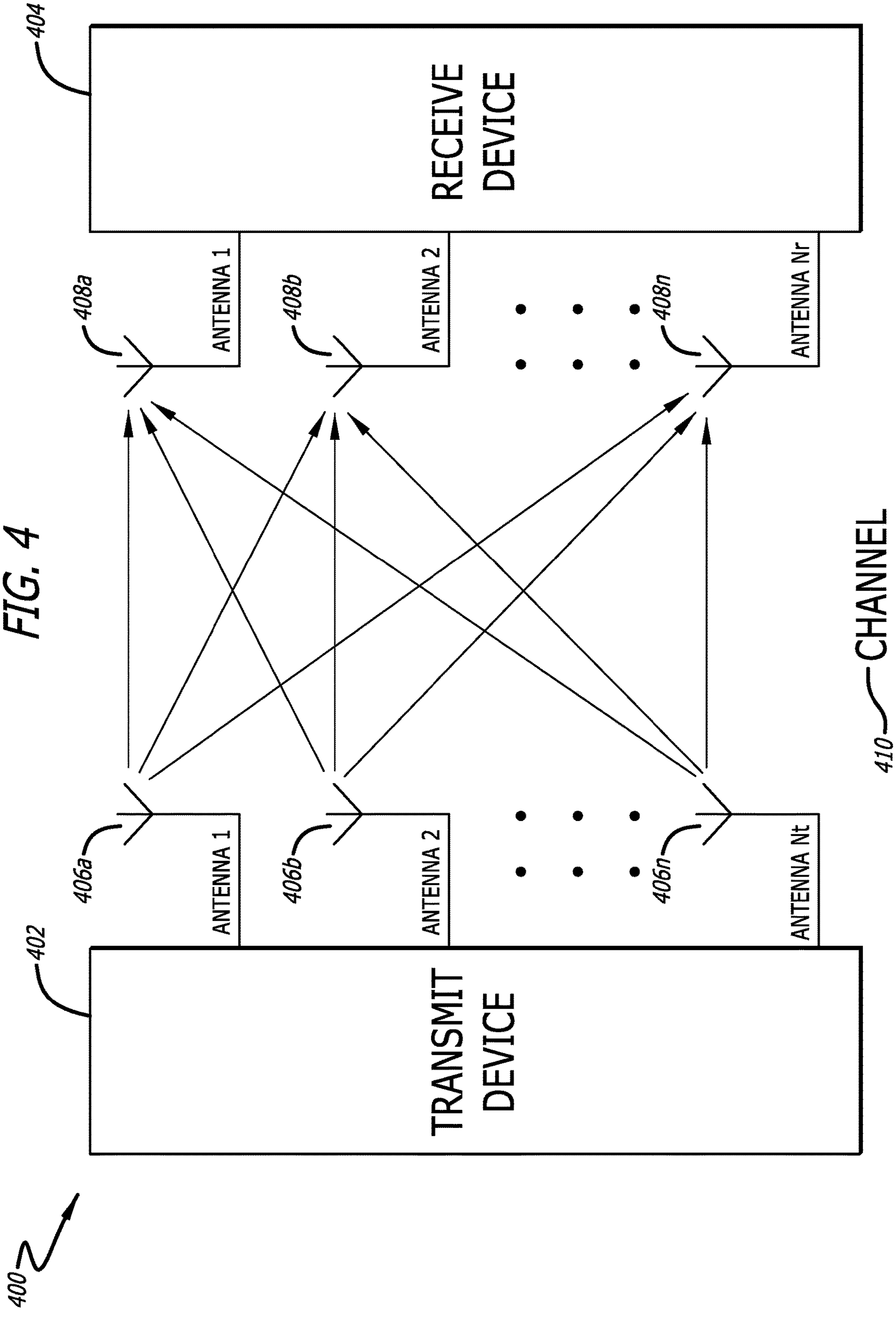
FIG. 4 is a diagram illustrating a transmit device and a receive device in accordance with various embodiments of the disclosure.

Referring to FIG. 4, a diagram 400 illustrating a transmit device and a receive device in accordance with various embodiments of the disclosure is shown. In many embodiments, a transmit device 402 and a receive device 404 may each be a multiple-input-multiple-output (MIMO) device. In particular, the transmit device 402 and the receive device 404 can each be equipped with multiple antennas for multiple transmit/receive chains. In a number of embodiments, each transmit/receive chain may include one or more of one or more antenna(s), an amplifier, a mixer, a filter, an analog-to-digital converter/digital-to-analog converter, a baseband processor, and/or a control unit. In a variety of embodiments, the transmit device 402 can include transmit antennas 406*a*, 406*b*, . . . , 406*n* for transmit chains 0, 1, . . . , n, respectively. Similarly, the receive device 404 may include receive antennas 408*a*, 408*b*, . . . , 408*n* for receive chains 0, 1, . . . , n, respectively. In some embodiments, there can be a channel 410 between each pair of transmit antenna(s) and receive antenna(s), which can be characterized by a parameter h. The parameter h may represent the CSI, which can provide a measure of the properties of the channel. The CSI may relate to the gain and phase shift introduced by the channel 410 on the transmitted signal. Accordingly, the CSI can be utilized to optimize the signal transmission and reception.

In more embodiments, the network devices (e.g., APs) may have multiple radios on different channels. Multiple radios (receive/transmit chains) can operate on a given channel. By way of non-limiting examples, a network device may have 2, 3, 4, 5 . . . transmit chains and 2, 3, 4, 5, . . . receive chains. In additional embodiments, a pair of ranging network devices can each set one of their radios to a common channel. The network devices may not know their relative orientation or distance, and thus cannot know if chain 0 exchanges will be biased. In further embodiments, the responding device can send a beamforming sound frame from its different radio chains. The initiating device may receive the frames on all its receive chains. In still more embodiments, the operation can be repeated in the reverse direction. In still further embodiments, the transmitting side may retain the order of the transmission, which may be the transmit chain number ordering for the transmissions.

In still additional embodiments, each receiving side can measure the CSI of the received signal on each of the receive chains. Thus, the signal sent from a single transmit chain may be observed on multiple receive chains simultaneously. In some more embodiments, the IFFT on each receive chain can provide the CIR measure, which may be utilized to evaluate the link between the transmitter (e.g., the transmit chain) and the receiver (e.g., the receive chain). Thus, besides gain and scaling, the initial test frame exchange can allow each receiving side to estimate, for each subcarrier, the quality of the link (for each subcarrier).

Although a specific embodiment for a transmit device and a receive device suitable for carrying out the various steps, processes, methods, and operations described herein is discussed with respect to FIG. 4, any of a variety of systems and/or processes may be utilized in accordance with embodiments of the disclosure. For example, the transmit and receive devices can incorporate machine learning processes to dynamically adjust their transmission and reception parameters based on the observed channel conditions. The elements depicted in FIG. 4 may also be interchangeable with other elements of FIGS. 1-3 and 5-11 as required to realize a particularly desired embodiment.

Figure 5:
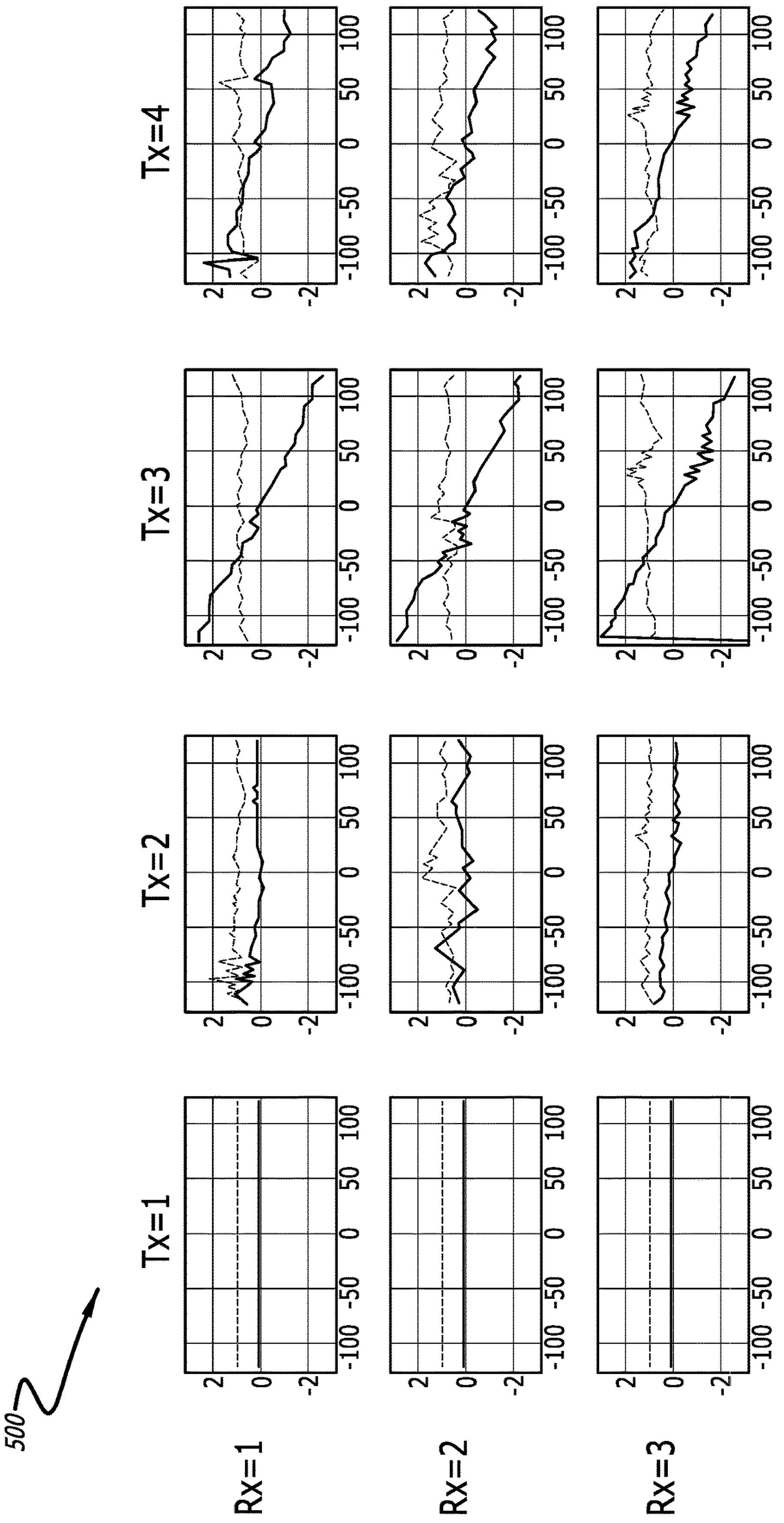
FIG. 5 is a diagram illustrating the channel state information (CSI) for each pair of a transmit chain and a receive chain in accordance with various embodiments of the disclosure.

Referring to FIG. 5, a diagram 500 illustrating the CSI for each pair of a transmit chain and a receive chain in accordance with various embodiments of the disclosure is shown. Embodiments depicted in FIG. 5 may show the CSI for all combinations of four transmit chains (i.e., transmit chains 1 through 4) and three receive chains (i.e., receive chains 1 through 3) for the transmissions in both directions. In the plots shown in FIG. 5, the x-axis may correspond to the tone (subcarrier) index, and the y-axis may correspond to the subcarrier angle (in radians). In many embodiments, the CSI as illustrated in FIG. 5 can be obtained from the initial test frame exchange process described in detail above. In a number of embodiments, based on the CSI, each device may determine a best transmit chain and a best receive chain (that is, the transmit chain and the receive chain associated with the highest CSI quality) at the device for FTM-based ranging-related exchanges with the other device. In a variety of embodiments, the CSI with the ideal quality may appear as a flat signal. In other words, high quality CSI across the channel can have a low CSI peak/trough count and low variation across the channel. A low CSI peak/trough count and low variations may be indicative of reduced obstacle presence on the path.

In some embodiments, based on these criteria, it can be seen from FIG. 5 that for both sides, the transmit chain 1 and the receive chain 1 are the combination that may provide the best quality for FTM-based ranging-related exchanges. In more embodiments, it may be likely that both sides can come to the same conclusion regarding the best transmit and receive chains. However, in additional embodiments, the decision can be local. In other words, each device may make its own independent decision based on its observations and measurements.

Although a specific embodiment for CSI for each pair of a transmit chain and a receive chain suitable for carrying out the various steps, processes, methods, and operations described herein is discussed with respect to FIG. 5, any of a variety of systems and/or processes may be utilized in accordance with embodiments of the disclosure. For example, the devices may incorporate advanced signal processing techniques to enhance the accuracy and reliability of the CSI measurements. The elements depicted in FIG. 5 may also be interchangeable with other elements of FIGS. 1-4 and 6-11 as required to realize a particularly desired embodiment.

Figure 6:
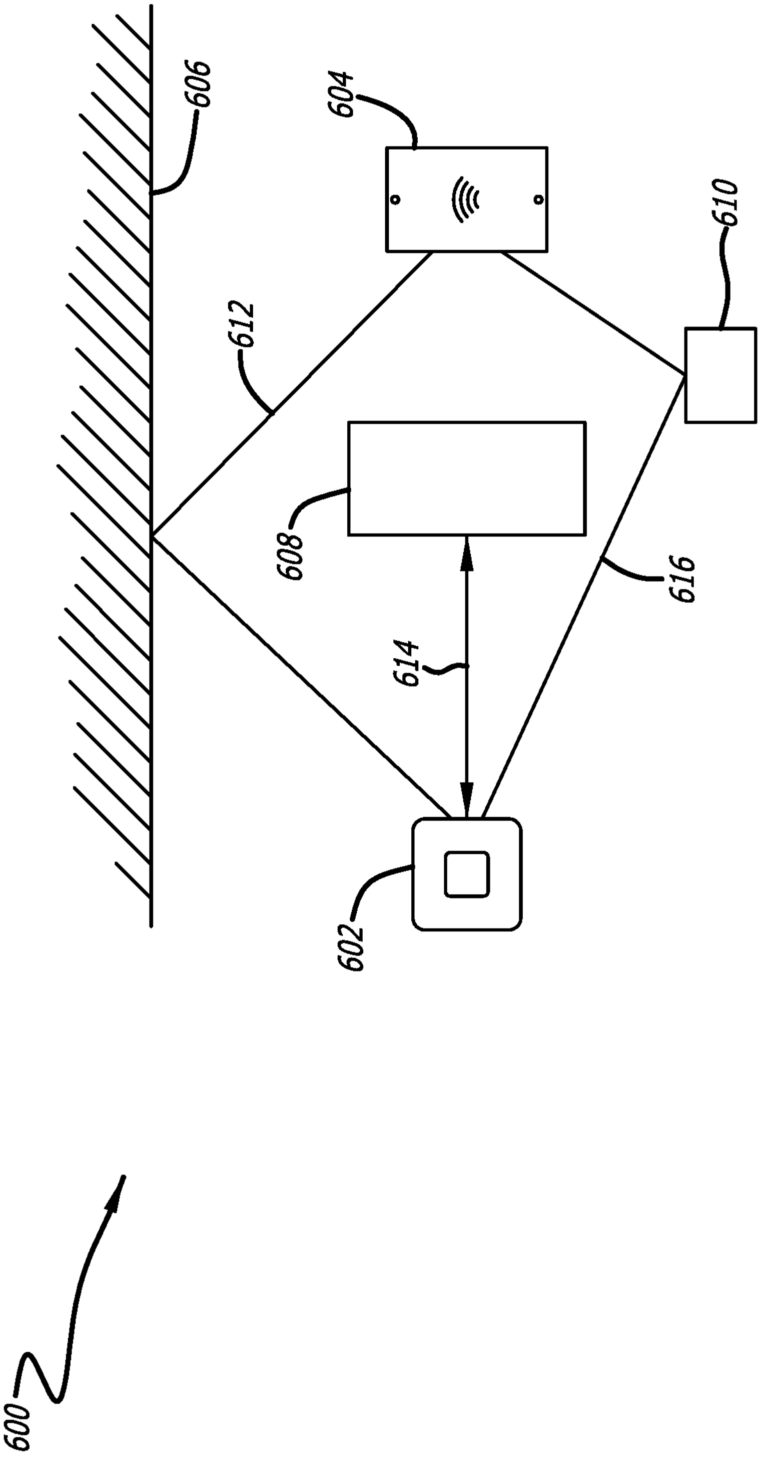
FIG. 6 is a diagram illustrating a non-line-of-sight (nLOS) scenario for FTM-based ranging in accordance with various embodiments of the disclosure.

Referring to FIG. 6, a diagram 600 illustrating an nLOS scenario for FTM-based ranging in accordance with various embodiments of the disclosure is shown. In many embodiments, the initiating device may range against the responding device on different enabled radios, which can correspond to different bands, and over multiple or all possible bandwidths (e.g., 20, 40, 80, etc. MHz). The initiating device can then compare the range measurements obtained from ranging in the different bands. In an LOS scenario, the range measurements may approximately be the same, with higher accuracy and smaller variance for range measurements obtained on larger bandwidths. If these conditions are observed (e.g., if range measurements obtained over different bands converge), the initiating device may conclude on an LOS scenario (i.e., the initiating device may determine that the channel is experiencing an LOS condition), and can adopt the range measurement obtained on the larger bandwidths as the result. In a number of embodiments, the initiating device may proceed to range against another responding device. In a variety of embodiments, an LOS condition may include an FTM-LOS condition (e.g., the condition shown in the embodiments depicted in the diagram 130 in FIG. 1). In an FTM-LOS condition, obstacles may be present, but may not create reflections or canyon effects that can stretch or compress the obtained range measurement. By way of non-limiting examples, simple, non-reflecting obstacles, such as, but not limited to, a wall between the initiating device and the responding device located in different rooms, may have an effect on the RSSI, but no significant effect on the FTM-based range measurements.

In some embodiments, as the embodiments depicted in FIG. 6 show, an obstacle 608 can obstruct the straight line signal path 614 between the responding device 602 and the initiating device 604. The presence of the reflective surface 606 may create a reflected, non-straight line signal path 612 between the responding device 602 and the initiating device 604. Additionally, the reflective obstacle 610 can create another reflected signal path 616 between the responding device 602 and the initiating device 604. In more embodiments, when an nLOS condition is present, such as when the environment is similar to the one shown in the embodiments depicted in FIG. 6, the reflection pattern on obstacles in the environment may cause the initiating device (e.g., the initiating device 604) to receive a reflected component as the primary signal, while the LOS signal can be too weak to reach the initiating device. The reflection pattern can be affected by the obstacles in the environment, and the frequency and bandwidth of the signal. In additional embodiments, a direct consequence of this phenomenon may be that the range measurements obtained through reflected paths are not the same (i.e., do not converge) when performed on different bands. However, the initiating device cannot know which band is associated with more accurate range measurements, if the range measurements are obtained over a same bandwidth (e.g., 80 MHz). Thus, in further embodiments, when the range measurements obtained on different bands are different, the initiating device may conclude on an nLOS scenario (i.e., the initiating device may determine that the channel is experiencing an nLOS condition).

Although a specific embodiment for nLOS scenario for FTM-based ranging suitable for carrying out the various steps, processes, methods, and operations described herein is discussed with respect to FIG. 6, any of a variety of systems and/or processes may be utilized in accordance with embodiments of the disclosure. For example, the devices may utilize adaptive beamforming techniques to focus their transmissions towards each other and reduce the impact of reflections and obstacles in the environment. The elements depicted in FIG. 6 may also be interchangeable with other elements of FIGS. 1-5 and 7-11 as required to realize a particularly desired embodiment.

Figure 7:
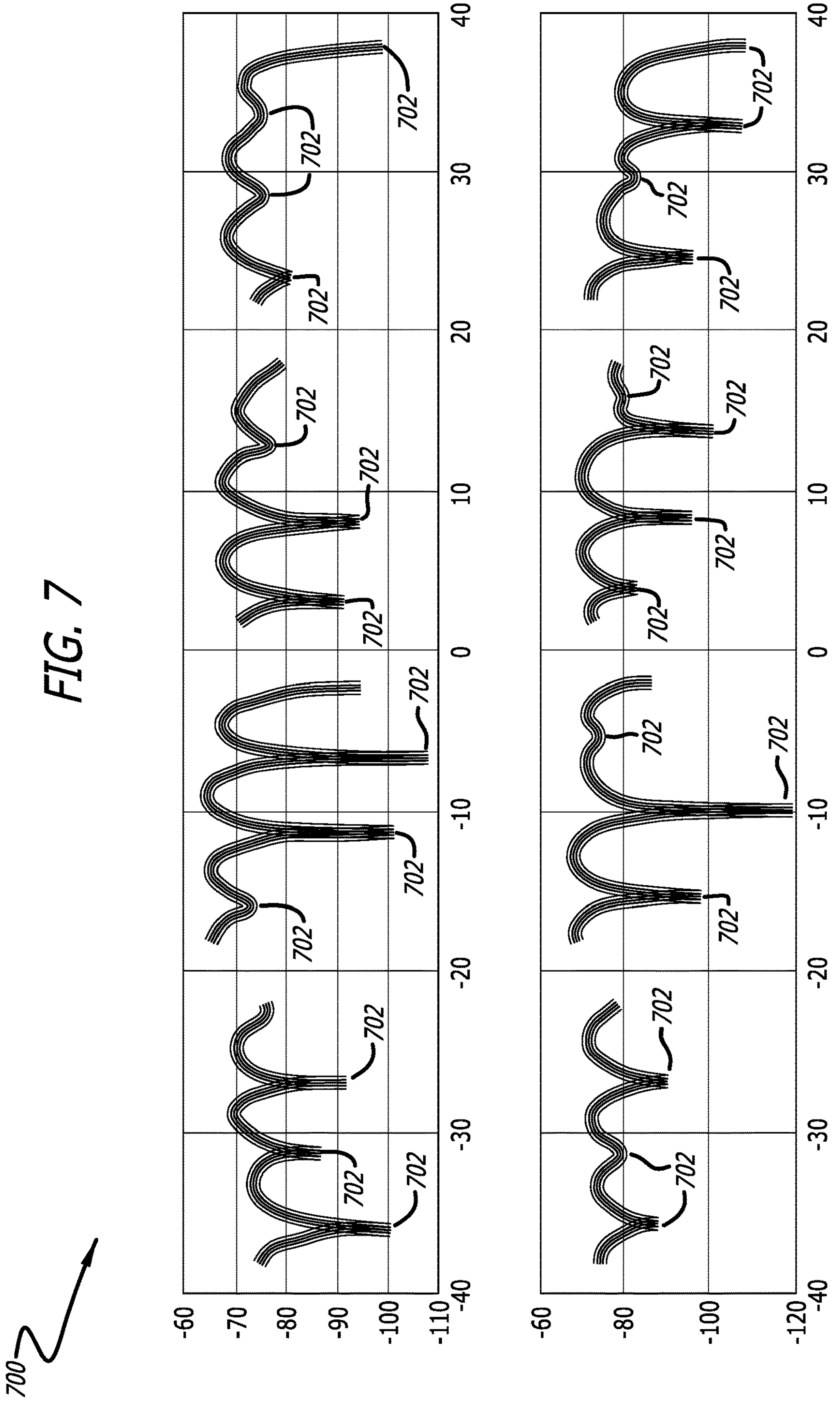
FIG. 7 is a diagram illustrating CSI structures in accordance with various embodiments of the disclosure.

Referring to FIG. 7, a diagram 700 illustrating CSI structures in accordance with various embodiments of the disclosure is shown. In many embodiments, when the range measurements obtained on different bands are different, the initiating device may conclude on an nLOS scenario, and can (re-)evaluate the CSI of the FTM frames (or other frames) received in each band. Paths with a higher reflection pattern, which can correspond to the multipath effect, can suffer from more severe distortions to the signal, which may translate into a greater number of dips and/or deeper dips in the CSI structure.

In a number of embodiments, embodiments depicted in FIG. 7 may represent example CSI structures with dips 702. In the plots shown in FIG. 7, the x-axis may correspond to the subcarrier index, and the y-axis can correspond to the received signal strength (e.g., RSSI). The depth and count of these dips 702 can provide an indication of the level of distortion caused by multipath effects. In a variety of embodiments, the initiating device may compute a distortion factor for each band based on the corresponding CSI structure. In some embodiments, the distortion factor can be a simple linear measurement of the depth of the dips, factored with the dip count over the band. In more embodiments, other metrics may also be utilized to evaluate the CSI distortion magnitude (corresponding to the distortion factor). In additional embodiments, by comparing the computed distortion factors, the initiating device can determine the degree to which each of the bands is affected by multipath.

In general, the multipath effect may affect the CIR peak detection accuracy; therefore, worse multipath can result in a less accurate range measurement. In further embodiments, after computing the distortion factors, the initiating device can select the band with the lowest distortion factor as the band most likely to yield an accurate range measurement (i.e., closer to the ground truth). In still more embodiments, the initiating device may apply a correction factor to the obtained range measurement, factoring in the distortion factor. In still further embodiments, the correction factor can be a heuristic computed from the comparison between the CSI distortion values obtained in different environments (e.g., a table correction). In still additional embodiments, the correction factor may be algorithmic, and can represent a relationship between the increase in the range reported from the FTM-based measurement and the worsening of the CSI. In some more embodiments, a (locally) linear function or a polynomial approximation can be utilized. As such, the error caused by multipath may be minimized, even though the exact ground truth cannot be found.

Although a specific embodiment for CSI structures suitable for carrying out the various steps, processes, methods, and operations described herein is discussed with respect to FIG. 7, any of a variety of systems and/or processes may be utilized in accordance with embodiments of the disclosure. For example, the devices can employ advanced machine learning processes to predict the distortion factor based on the observed CSI structures. The elements depicted in FIG. 7 may also be interchangeable with other elements of FIGS. 1-6 and 8-11 as required to realize a particularly desired embodiment.

Figure 8:
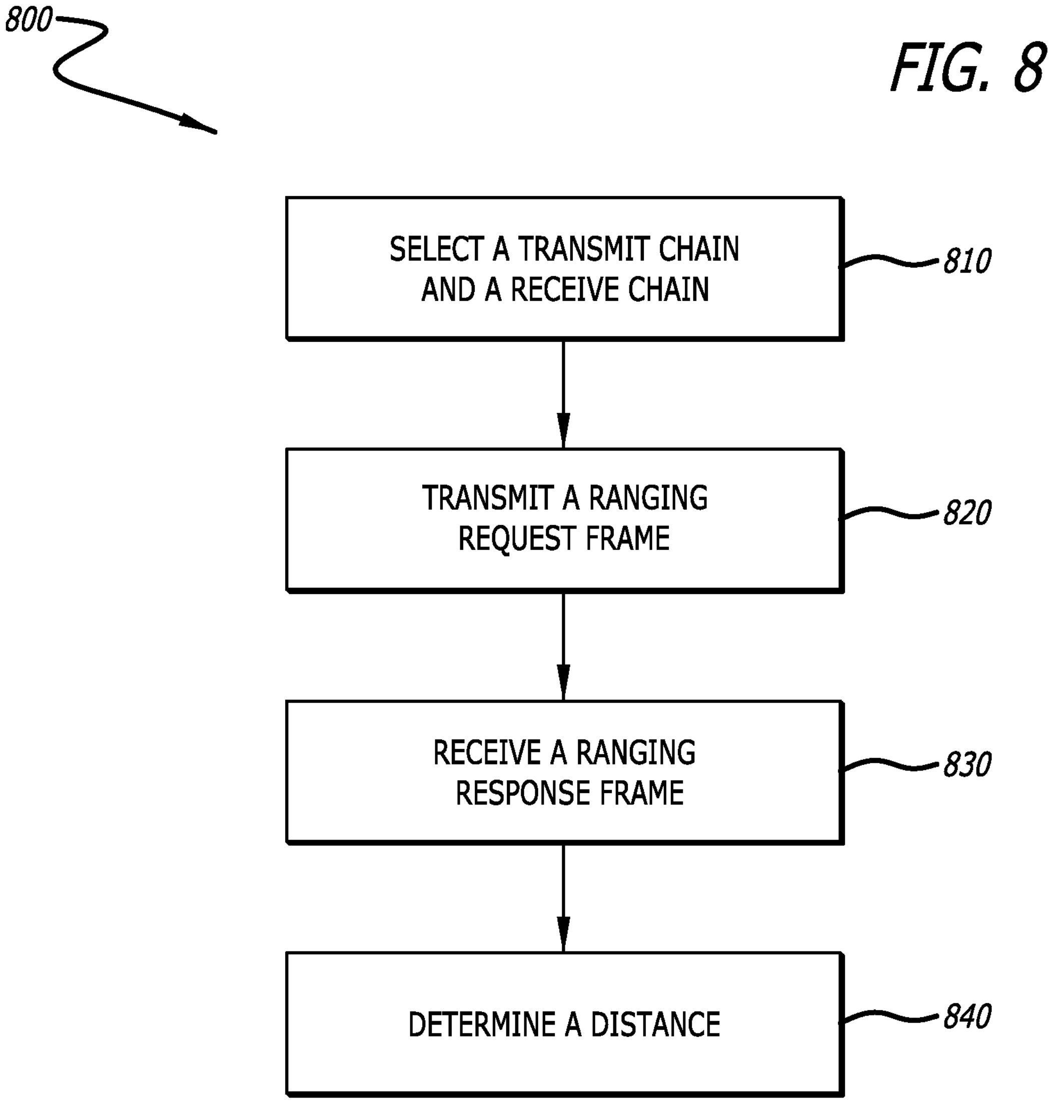
FIG. 8 is a flowchart showing a process for determining a distance between two devices in accordance with various embodiments of the disclosure.

Referring to FIG. 8, a flowchart showing a process 800 for determining a distance between two devices in accordance with various embodiments of the disclosure is shown. In many embodiments, the process 800 may select a transmit chain and a receive chain (block 810). In a number of embodiments, the selection can be from multiple transmit chains and multiple receive chains available at the network device for a ranging measurement associated with another network device (e.g., a first network device). In a variety of embodiments, the selection may be based on the quality of the outgoing and incoming links associated with each chain. In some embodiments, the quality of the links can be determined through the transmission and reception of test frames and the subsequent analysis of the received CSI feedback.

In more embodiments, the process 800 may transmit a ranging request frame (block 820). In additional embodiments, the transmission can be to the first network device and based on the selected transmit chain. In further embodiments, the ranging request frame may contain data such as, but not limited to, the identity of the network device, the desired transmit and receive chains, and/or any other suitable parameters. In still more embodiments, the ranging request frame may be an FTM request frame.

In still further embodiments, the process 800 may receive a ranging response frame (block 830). In still additional embodiments, the reception can be from the first network device and based on the selected receive chain. In some more embodiments, the ranging response frame may be sent by the first network device in response to the ranging request frame. In certain embodiments, the ranging response frame can contain data such as, but not limited to, the measured time of arrival of the ranging request frame, the identity of the first network device, and/or any other suitable parameters. In yet more embodiments, the ranging response frame may be an FTM response frame.

In still yet more embodiments, the process 800 can determine a distance between the network device and the first network device (block 840). In many further embodiments, the distance may be determined based on a round-trip time between the network device and the first network device. In many additional embodiments, the determination can involve calculating the time of flight of the signal and then converting this into a distance utilizing the speed of light. In still yet further embodiments, the round-trip time may correspond to a duration between the transmission of the ranging request frame and the reception of the ranging response frame.

Although a specific embodiment for determining a distance between two devices suitable for carrying out the various steps, processes, methods, and operations described herein is discussed with respect to FIG. 8, any of a variety of systems and/or processes may be utilized in accordance with embodiments of the disclosure. For example, the network device can be an AP that uses this process to determine the distance to another AP, which may be useful for applications such as, but not limited to, indoor positioning or network optimization. The elements depicted in FIG. 8 may also be interchangeable with other elements of FIGS. 1-7 and 9-11 as required to realize a particularly desired embodiment.

Figure 9:
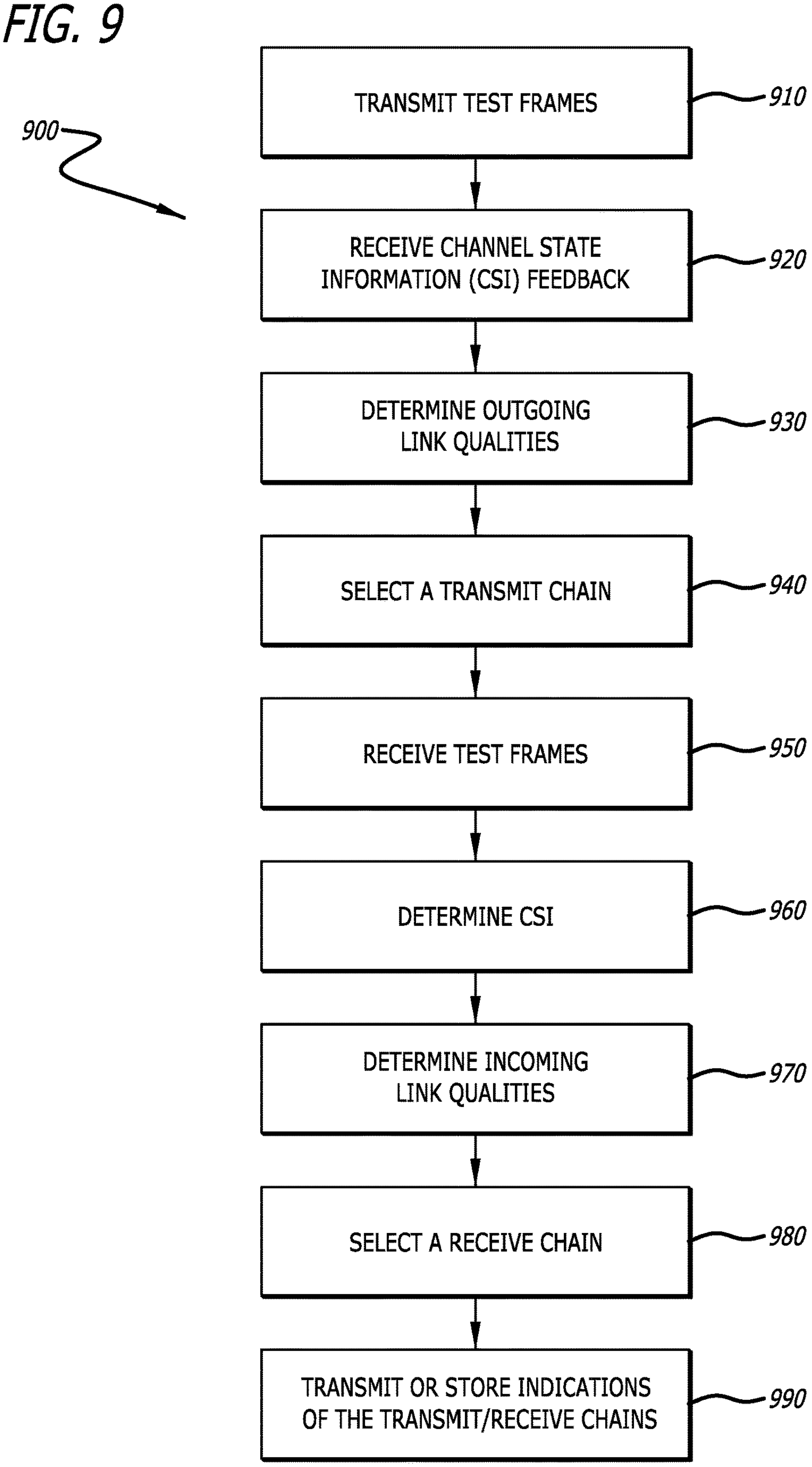
FIG. 9 is a flowchart showing a process for selecting transmit and receive chains for a ranging measurement in accordance with various embodiments of the disclosure.

Referring to FIG. 9, a flowchart showing a process 900 for selecting transmit and receive chains for a ranging measurement in accordance with various embodiments of the disclosure is shown. In many embodiments, the process 900 may transmit test frames (block 910). In a number of embodiments, the test frames can be transmitted utilizing each of the plurality of transmit chains of the network device. In a variety of embodiments, the test frames may be beamforming sound frames or iFTM frames. The transmission of these frames can allow for the evaluation of the quality of the outgoing links associated with each transmit chain.

In some embodiments, the process 900 may receive CSI feedback (block 920). In more embodiments, the CSI feedback can be associated with each test frame. In additional embodiments, the CSI feedback may relate to the state of the channel, including, but not limited to, the level of interference, the signal strength, and/or the signal-to-noise ratio (SNR).

In further embodiments, the process 900 can determine outgoing link qualities (block 930). In still more embodiments, the outgoing link quality may be determined for each of the plurality of transmit chains based on the received CSI feedback. In still further embodiments, this may involve analyzing the CSI feedback to assess the quality of the link associated with each transmit chain. In still additional embodiments, the quality assessment can be based on various factors such as, but not limited to, how much the shape of the CSI feedback resembles a flat line.

In some more embodiments, the process 900 can select a transmit chain (block 940). In certain embodiments, the transmit chain may be selected based on the determined outgoing link qualities. In yet more embodiments, the transmit chain with the highest outgoing link quality can be selected for the ranging measurement. This selection may ensure that the best possible transmit chain is utilized for the ranging measurement.

In still yet more embodiments, the process 900 may receive test frames (block 950). In many further embodiments, the test frames can be received from the first network device utilizing the plurality of receive chains. In many additional embodiments, the test frames may be utilized to evaluate the quality of the incoming link associated with each receive chain.

In still yet further embodiments, the process 900 can determine per-receive chain CSI (block 960). By way of non-limiting example, "per-receive chain" may include information and/or data related to a particular receiving antenna chain in a MIMO or similar configuration. Those skilled in the art will appreciate that a multi-antenna Wi-Fi system may experience a slightly different channel conditions due to the spatial diversity of the wireless environment. In such instances it is envisioned that a per-receive chain CSI may provide insights into the channel characteristics for each receiving antenna chain.

In still yet additional embodiments, the per-receive chain CSI may be determined for each of the plurality of receive chains based on the received test frames. In several embodiments, this can involve analyzing the received test frames to assess the state of the channel for each receive chain. The per-receive chain CSI may provide a detailed view of the channel conditions for each receive chain.

In several more embodiments, the process 900 can determine incoming link qualities (block 970). In numerous embodiments, the incoming link quality may be determined for each of the plurality of receive chains based on the corresponding per-receive chain CSI. In numerous additional embodiments, the quality assessment can be based on various factors such as, but not limited to, how much the shape of the corresponding per-receive chain CSI resembles a flat line.

In further additional embodiments, the process 900 can select a receive chain (block 980). In some embodiments, the receive chain may be selected based on the determined incoming link qualities. In more embodiments, the receive chain with the highest incoming link quality can be selected for the ranging measurement. This selection may ensure that the best possible receive chain is utilized for the ranging measurement.

In additional embodiments, the process 900 can transmit or store indications of the selected transmit and receive chains (block 990). In further embodiments, the indications may be transmitted to the first network device or a controller (e.g., a WLC), or they can be stored in a data store for future use. In still more embodiments, the transmission or storage of these indications may allow for the reuse of the selected chains in future ranging measurements with the same first network device without performing the initial test frame exchanges again.

Although a specific embodiment for selecting transmit and receive chains for a ranging measurement suitable for carrying out the various steps, processes, methods, and operations described herein is discussed with respect to FIG. 9, any of a variety of systems and/or processes may be utilized in accordance with embodiments of the disclosure. For example, the network device can periodically re-select the transmit and receive chains for subsequent ranging measurements based on the stored indications of the selected transmit and receive chains. The elements depicted in FIG. 9 may also be interchangeable with other elements of FIGS. 1-8, 10, and 11 as required to realize a particularly desired embodiment.

Figure 10:
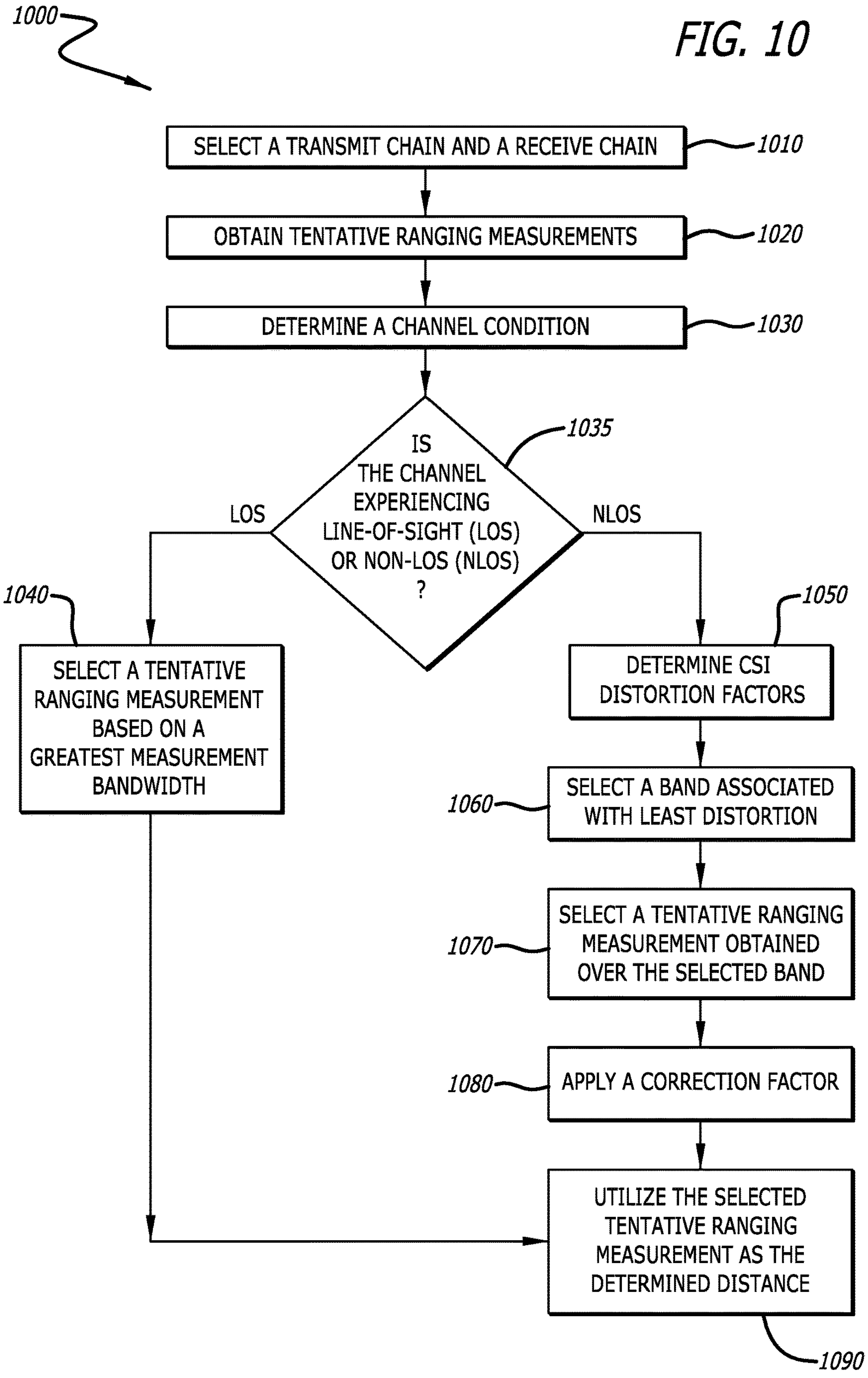
FIG. 10 is a flowchart showing a process for determining a distance between two devices in accordance with various embodiments of the disclosure.

Referring to FIG. 10, a flowchart showing a process 1000 for determining a distance between two devices in accordance with various embodiments of the disclosure is shown. In many embodiments, the process 1000 may select a transmit chain and a receive chain from a plurality of such chains available in the network device for a ranging measurement associated with a first network device (block 1010). In a number of embodiments, the selection can be from multiple transmit chains and multiple receive chains available at the network device for a ranging measurement associated with another network device (e.g., a first network device). In a variety of embodiments, the selection may be based on the quality of the outgoing and incoming links associated with each chain. In some embodiments, the quality of the links can be determined through the transmission and reception of test frames and the subsequent analysis of the received CSI feedback.

In more embodiments, the process 1000 may obtain tentative ranging measurements (block 1020). In additional embodiments, the multiple tentative ranging measurements associated with the first network device can be obtained over multiple bands based on the selected transmit chain and the selected receive chain. In further embodiments, the ranging measurements may be taken over the multiple bands to account for potential variations in signal propagation across different frequency bands.

In still more embodiments, the process 1000 can determine a channel condition (block 1030). In still further embodiments, the channel condition between the network device and the first network device may be determined based on whether the multiple tentative ranging measurements converge. The channel condition can be important because the channel condition may affect the accuracy of the ranging measurements.

In still additional embodiments, the process 1000 may determine whether the channel between the network device and the first network device experiences an LOS condition or an nLOS condition (block 1035). In some more embodiments, this determination can be based on the spread of the tentative ranging measurements, which can provide an indication of the variability of the signal propagation conditions over the different bands. In certain embodiments, if the channel is determined to be experiencing an LOS condition, the process 1000 can select one of the tentative ranging measurements based on a greatest measurement bandwidth. However, in yet more embodiments, when the channel is determined to be experiencing an nLOS condition, the process 1000 can determine CSI distortion factors for each band in the plurality of bands.

In still yet more embodiments, if the channel is determined to be experiencing an LOS condition, the process 1000 can select a tentative ranging measurement based on a greatest measurement bandwidth (block 1040). The tentative measurement associated with the greatest measurement bandwidth may be chosen because the greatest bandwidth typically can provide the highest resolution for the ranging measurement. The selected tentative ranging measurement may be utilized as the determined distance between the network device and the first network device.

However, in many further embodiments, when the channel is determined to be experiencing an nLOS condition, the process 1000 can determine CSI distortion factors (block 1050). In many additional embodiments, a CSI distortion factor may be determined for each band in the plurality of bands. In still yet further embodiments, the CSI distortion factors can be determined based on the CSI structures associated with the FTM frames or other frames over the bands. In still yet additional embodiments, a greater number of dips and/or deeper dips in the CSI structure may be associated with a greater CSI distortion factor. The CSI distortion factors can provide a measure of the signal distortion experienced in each band.

In several embodiments, the process 1000 can select a band associated with the least signal distortion (block 1060). In several more embodiments, the band associated with the least signal distortion may be selected based on the determined CSI distortion factors. In particular, the band having the lowest CSI distortion factor can be the band associated with the least signal distortion. The band with the least distortion may be chosen to ensure the most accurate ranging measurement in nLOS conditions.

In numerous embodiments, the process 1000 can select a tentative ranging measurement obtained over the selected band associated with the least signal distortion (block 1070). The selection, compared to other unselected tentative ranging measurements, may provide the most accurate estimate of the distance in nLOS conditions. In numerous additional embodiments, the selected tentative ranging measurement can then be utilized as the basis for the final distance determination.

In further additional embodiments, the process 1000 can apply a correction factor (block 1080). In some embodiments, the correction factor may be applied to the selected tentative ranging measurement. In more embodiments, the correction factor can be calculated based on the lowest CSI distortion factor that is associated with the selected tentative ranging measurement. Applying the correction factor may help to further improve the accuracy of the distance measurement. The application of the correction factor can compensate for residual distortion that may still be present in the selected measurement.

In additional embodiments, the process 1000 can utilize the selected tentative ranging measurement as the determined distance between the network device and the first network device (block 1090). In further embodiments, the determined distance may be utilized for various purposes, such as, but not limited to, network optimization or indoor positioning. The utilization of the selected measurement can ensure that the most accurate and reliable possible distance estimate is used for subsequent operations.

Although a specific embodiment for determining a distance between two devices suitable for carrying out the various steps, processes, methods, and operations described herein is discussed with respect to FIG. 10, any of a variety of systems and/or processes may be utilized in accordance with embodiments of the disclosure. For example, the network device may utilize a similar process to dynamically adjust the ranging measurement process based on the changing network conditions, thereby ensuring the most accurate distance estimation possible under both LOS and nLOS conditions. The elements depicted in FIG. 10 may also be interchangeable with other elements of FIGS. 1-9 and 11 as required to realize a particularly desired embodiment.

Figure 11:
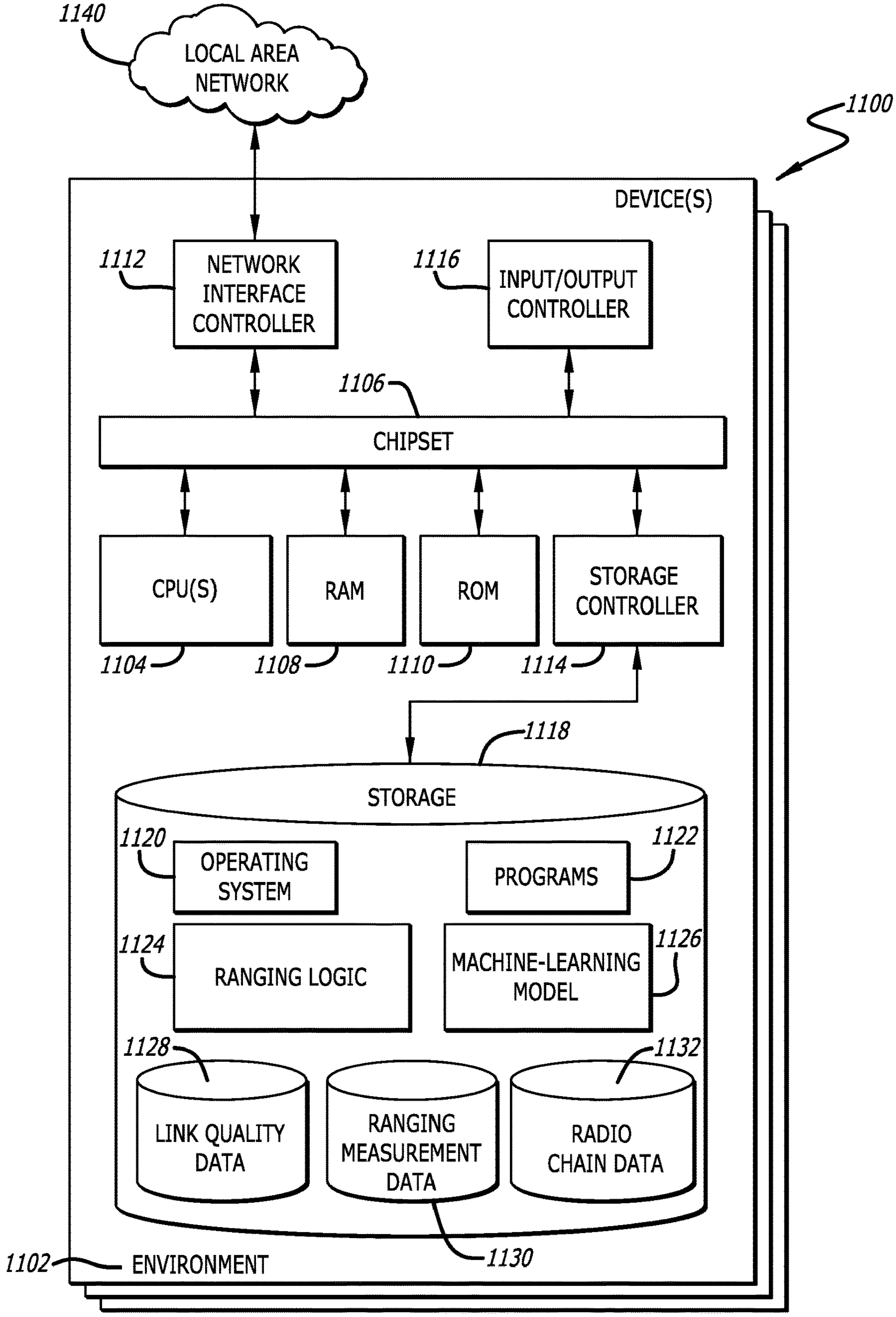
FIG. 11 is a conceptual block diagram for one or more devices capable of executing components and logic for implementing the functionality and embodiments described above.

Referring to FIG. 11, a conceptual block diagram for one or more devices 1100 capable of executing components and logic for implementing the functionality and embodiments described above is shown. The embodiment of the conceptual block diagram depicted in FIG. 11 can illustrate a conventional server computer, workstation, desktop computer, laptop, tablet, network appliance, e-reader, smartphone, or other computing device, and can be utilized to execute any of the application and/or logic components presented herein. The device 1100 may, in some examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In additional embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the processor(s) 1104 and the remainder of the components and devices within the environment 1102. The chipset 1106 can provide an interface to a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, applications 1122, link quality data 1128, ranging measurement data 1130, and radio chain data 1132, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-10. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11, and can include other components that are not explicitly shown in FIG. 11, or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include a ranging logic 1124. The ranging logic 1124 may be responsible for managing and executing ranging measurements between devices. The ranging logic 1124 can perform tasks such as, but not limited to, selecting transmit and receive chains, transmitting and receiving ranging frames, and/or calculating distances based on the round-trip time of the signals.

In a number of embodiments, the storage 1118 can include link quality data 1128. The link quality data 1128 may relate to the quality of a wireless connection between two devices. The link quality data 1128 can include metrics such as, but not limited to, signal strength, SNR, interference levels, and/or other factors that can influence the performance and reliability of the wireless link.

In various embodiments, the storage 1118 can include ranging measurement data 1130. The ranging measurement data 1130 may refer to the data collected during the process of determining the distance between two network devices. The ranging measurement data 1130 can include, but is not limited to, the time of flight of signals, the round-trip time of the signals, and/or other parameters that can be utilized to calculate the distance between the devices.

In still more embodiments, the storage 1118 can include radio chain data 1132. The radio chain data 1132 may relate to the transmit and receive chains in a network device. The radio chain data 1132 can include the characteristics of each chain, such as, but not limited to, its capabilities, performance metrics, and the quality of the links associated with it.

Finally, in many embodiments, data may be processed into a format usable by a machine-learning model 1126 (e.g., feature vectors), and or other pre-processing techniques. The machine-learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126. The ML model 1126 may be configured to analyze the link quality data 1128, radio chain data 1132, and ranging measurement data 1130 to predict the optimal transmit and receive chains for future ranging measurements.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network device, comprising:
a processor;
at least one network interface controller configured to provide access to a network; and
a memory communicatively coupled to the processor, wherein the memory comprises a ranging logic that is configured to:
select a transmit chain in a plurality of transmit chains of the network device and a receive chain in a plurality of receive chains of the network device for a ranging measurement associated with a first network device;
transmit a ranging request frame to the first network device based on the selected transmit chain;
receive a ranging response frame from the first network device based on the selected receive chain;
determine a distance between the network device and the first network device based on a round-trip time between the network device and the first network device; and
determine whether a channel between the network device and the first network device experiences a line-of-sight (LOS) condition or a non-LOS (nLOS) condition, wherein the determination is based on a spread of tentative ranging measurements.

2. The network device of claim 1, wherein the round-trip time corresponds to a duration between the transmission of the ranging request frame and the reception of the ranging response frame.

3. The network device of claim 1, wherein the ranging request frame comprises a fine timing measurement (FTM) request frame, and the ranging response frame comprises an FTM response frame.

4. The network device of claim 1, wherein to select the transmit chain, the ranging logic is further configured to:
transmit, using each of the plurality of transmit chains, a test frame to the first network device;
receive channel state information (CSI) feedback associated with each test frame; and
determine, for each of the plurality of transmit chains, an outgoing link quality associated with the first network device based on the received respective CSI feedback, where the transmit chain is selected based on the transmit chain being associated with a highest outgoing link quality in the plurality of transmit chains.

5. The network device of claim 4, wherein the test frame comprises a beamforming sound frame or an initiator fine timing measurement (iFTM) frame.

6. The network device of claim 1, wherein to select the receive chain, the ranging logic is further configured to:
receive, using the plurality of receive chains, one or more test frames from the first network device;
determine per-receive chain channel state information (CSI) for each of the plurality of receive chains based on the received one or more test frames; and
determine, for each of the plurality of receive chains, an incoming link quality associated with the first network device based on the per-receive chain CSI, wherein the receive chain is selected based on the receive chain being associated with a highest incoming link quality in the plurality of receive chains.

7. The network device of claim 1, wherein the ranging logic is further configured to transmit an indication of the selected transmit chain or an indication of the selected receive chain to the first network device or a controller.

8. The network device of claim 1, wherein the ranging logic is further configured to store an indication of the selected transmit chain and an indication of the selected receive chain in a data store.

9. The network device of claim 8, wherein the ranging logic is further configured to re-select the transmit chain and the receive chain for another ranging measurement associated with the first network device based on the stored indication of the selected transmit chain and the stored indication of the selected receive chain.

10. The network device of claim 1, wherein to determine whether the channel experiences the LOS condition or the nLOS condition, the ranging logic is further configured to:
obtain a plurality of tentative ranging measurements associated with the first network device over a plurality of bands based on the selected transmit chain and the selected receive chain; and
wherein the channel is determined to experience the LOS condition if the spread of the plurality of tentative ranging measurements is less than a threshold, and the channel is determined to experience the nLOS condition if the spread of the plurality of tentative ranging measurements is greater than the threshold.

11. The network device of claim 10, wherein each tentative ranging measurement in the plurality of tentative ranging measurements is based on a respective measurement bandwidth, and device in response to the channel being determined to experience the LOS condition, the ranging logic is further configured to take a tentative ranging measurement based on a greatest measurement bandwidth as the determined distance between the network device and the first network device.

12. The network device of claim 10, wherein in response to the channel being determined to experience the nLOS condition, the ranging logic is further configured to:
select a band associated with least signal distortion in the plurality of bands; and
take a tentative ranging measurement obtained over the selected band associated with the least signal distortion as the determined distance between the network device and the first network device.

13. The network device of claim 12, wherein to determine the band associated with the least signal distortion, the ranging logic is further configured to:
transmit, for each band in the plurality of bands, one or more test frames to the first network device based on the selected transmit chain;
receive, for each band in the plurality of bands, channel state information (CSI) feedback associated with the respective one or more test frames; and
determine, for each band in the plurality of bands, a respective CSI distortion factor based on a corresponding CSI feedback,
wherein the band associated with the least signal distortion corresponds the band having a lowest CSI distortion factor.

14. The network device of claim 13, wherein the respective CSI distortion factor is determined based on a structure of the corresponding CSI feedback.

15. The network device of claim 14, wherein the structure of the corresponding CSI feedback comprises one or more depths of one or more dips and a count of the one or more dips.

16. The network device of claim 13, wherein the ranging logic is further configured to:

calculate a correction factor based on the lowest CSI distortion factor; and apply the correction factor to the determined distance between the network device and the first network device.

17. The network device of claim 1, wherein the network device comprises an access point (AP).

18. A network device, comprising:

a processor;

at least one network interface controller configured to provide access to a network; and a memory communicatively coupled to the processor, wherein the memory comprises a ranging logic that is configured to:

select a transmit chain in a plurality of transmit chains of the network device and a receive chain in a plurality of receive chains of the network device for a ranging measurement associated with a first network device;

determine whether a channel between the network device and the first network device experiences a line-of-sight (LOS) condition or a non-LOS (nLOS) condition, wherein the determination is based on a spread of tentative ranging measurements;

transmit a ranging request frame to the first network device based on the selected transmit chain;

receive a ranging response frame from the first network device based on the selected receive chain; and determine a distance between the network device and the first network device based on a round-trip time between the network device and the first network device and the channel being determined to experience the LOS condition or the nLOS condition.

19. A method for performing a ranging measurement, comprising:

selecting a transmit chain in a plurality of transmit chains of a network device and a receive chain in a plurality of receive chains of the network device for the ranging measurement associated with a first network device;

transmitting a ranging request frame to the first network device based on the selected transmit chain;

receiving a ranging response frame from the first network device based on the selected receive chain;

determining a distance between the network device and the first network device based on a round-trip time between the network device and the first network device; and determining whether a channel between the network device and the first network device experiences an LOS condition or an nLOS condition, wherein the determination is based on a spread of tentative ranging measurements.

* * * * *